March 10, 1959  H. F. STREIB  2,876,965
CIRCULAR WING AIRCRAFT WITH UNIVERSALLY
TILTABLE DUCTED POWER PLANT
Filed July 23, 1956  2 Sheets-Sheet 1

INVENTOR.
HOMER F. STREIB
BY
Knox & Knox

March 10, 1959 H. F. STREIB 2,876,965
CIRCULAR WING AIRCRAFT WITH UNIVERSALLY
TILTABLE DUCTED POWER PLANT
Filed July 23, 1956 2 Sheets-Sheet 2

INVENTOR.
HOMER F. STREIB
BY
Knox & Knox

2,876,965

CIRCULAR WING AIRCRAFT WITH UNIVERSALLY TILTABLE DUCTED POWER PLANT

Homer F. Streib, Chula Vista, Calif.

Application July 23, 1956, Serial No. 599,571

6 Claims. (Cl. 244—12)

The present invention relates generally to aircraft and more particularly to a circular wing aircraft capable of vertical and horizontal flight.

The primary object of this invention is to provide a circular wing aircraft having a shiftable impeller mounted in a central opening in the wing and arranged to move air radially inwardly over at least a major portion of the upper surface of the wing, in all positions of the impeller, and since the radial cross-section of the wing is an efficient airfoil a major portion of the lift is obtained from this radial airflow thus achieving simple, efficient design.

Another object of this invention is to provide a circular wing aircraft in which the impeller is encircled by a shroud ring to duct the air more effectively and increase the efficiency of the impeller in all positions thereof.

Another object of this invention is to provide a circular wing aircraft in which the impeller and its shroud ring are tiltable through at least 90 degrees about the lateral axis of the aircraft to provide forward thrust for horizontal flight.

Another object of this invention is to provide a circular wing aircraft in which the impeller is tiltable to a limited degree about the longitudinal axis of the aircraft to provide a lateral thrust component.

Finally, it is an object to provide a circular wing aircraft which, by suitable control of the impeller, can be safely flown in many different directions of flight, control being maintained in both high and low speed ranges.

With these and other objects which will appear hereinafter definitely in view, this invention consists in the novel construction, combination and arrangement of elements and portions, as will be hereinafter fully described in the specification, particularly pointed out in the claims, and illustrated in the drawings which form a material part of this disclosure, and in which:

Figure 1:
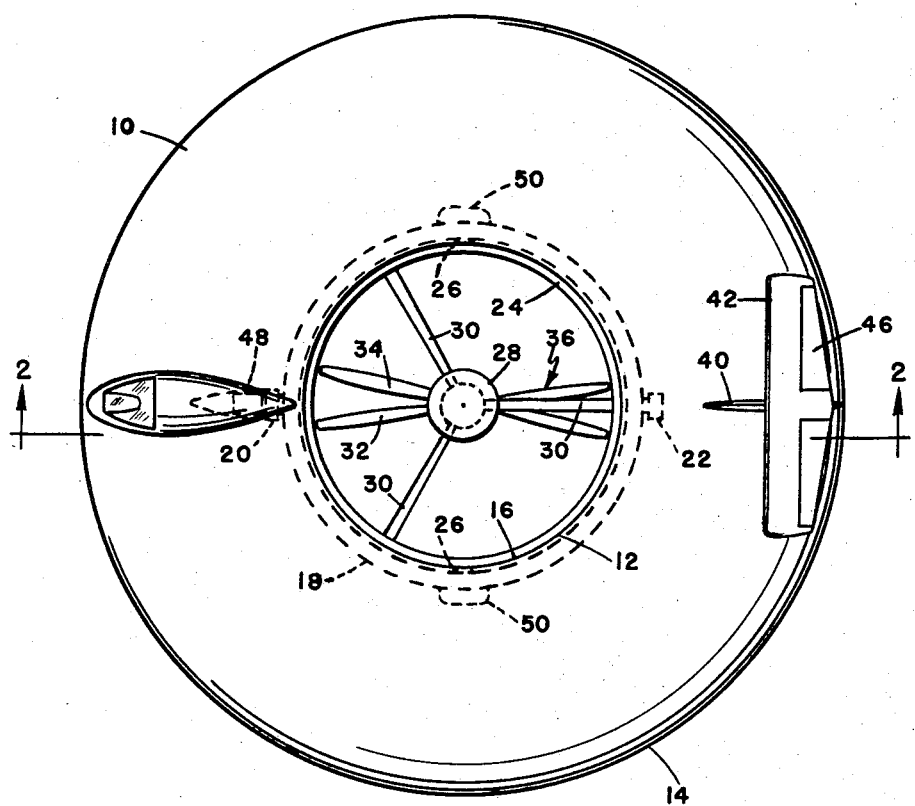
Figure 1 is a top plan view of the aircraft.
Figure 2:
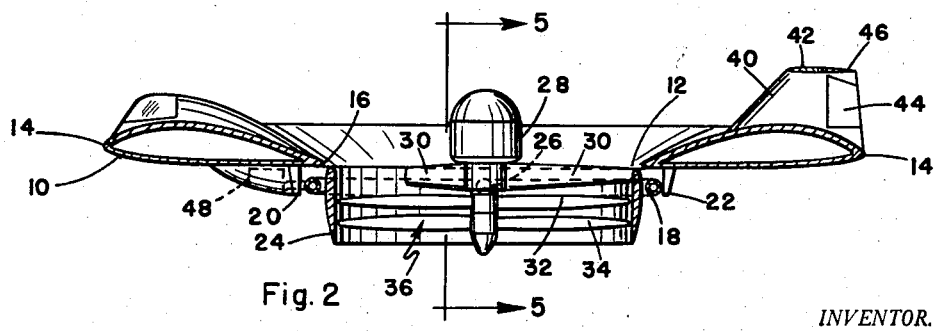
Figure 2 is a vertical sectional view taken on the line 2—2 of Figure 1.

Referring now to the drawings in detail, the aircraft comprises a circular wing 10 having a central, substantially circular opening 12. The cross-sectional shape of the wing may be constant as shown and must constitute an efficient airfoil in respect of an airflow induced toward said opening. The chord of the airfoil of the wing 10 extends in a radial direction. Beneath the opening 12 and concentric therewith is a gimbal ring 18 which is mounted for pivotal movement about the longitudinal axis of the wing between a front bearing 20 and a rear bearing 22, said bearings extending downwardly below the wing adjacent to the opening 12. Within the gimbal ring 18 is mounted an axially elongated circular shroud ring 24, which is supported by diametrically opposed bearings 26 extending from said gimbal ring along the lateral axis of the aircraft. Centrally mounted in the shroud ring 24 is a motor 28 which is supported by a spider type structure having radial support arms 30 fixed to said shroud ring and the motor. The term "motor" is used herein in the broadest sense, as any suitable type power plant can be used. In the illustrated form counter-rotating propellers 32—34 with their tips enclosed by the shroud ring 24 constitutes the thrust-producing unit which will be referred to herein as the impeller 36. With the impeller 36 in the horizontal or vertical thrust position as in Figures 1, 2 and 5, the motor 28 is located above the impeller and substantially outside the shroud ring 24.

At the forward edge of the wing 10 is a cockpit structure 38 while at the rear is an upwardly extending fin 40, on top of which is mounted a horizontal tailplane 42. The fin 40 and tailplane 42 are provided with a movable rudder 44 and elevons 46, respectively, to provide direction control in normal forward flight. The elevons 46, of course, are similar to those used on conventional tailless aircraft and provide both pitching and rolling control. However, in low speed on vertical flight, control is obtained by tilting the impeller 36. For tilting movement about the longitudinal axis an actuating motor 48 is installed in the front bearing 20, while for movement about the lateral axis actuating motors 50 are mounted on the gimbal ring 18 and coupled to the bearings 26. The actuating motors 48 and 50 may be of any suitable type such as electric or hydarulic units, the actual means for achieving tilting motions not being considered critical in the present disclosure and being diagrammatically illustrated.

Figure 5:
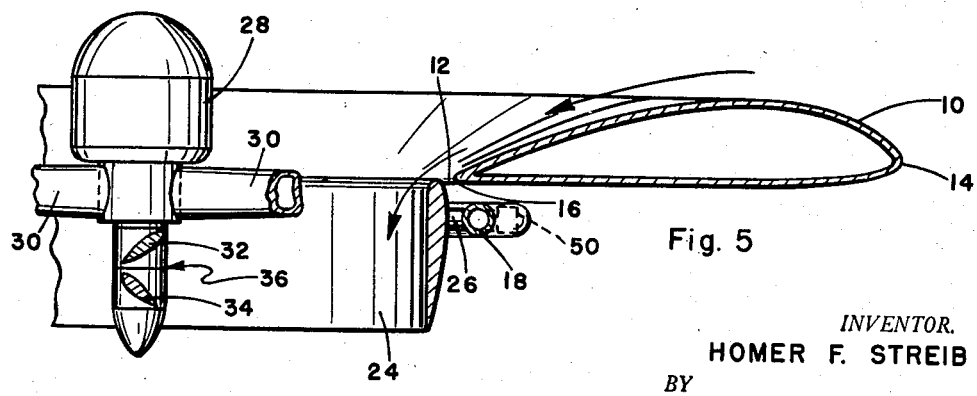
Figure 5 is an enlarged fragmentary sectional view taken on the line 5—5 of Figure 2.

In operation, for vertical flight, the impeller 36 creates a downwardly moving airstream through the shroud ring 24, which causes air to be drawn radially inwardly over the upper surface of the wing 10 as shown by the direction arrows in Figure 5. Since the cross sectional shape of the wing in a radial direction represents an efficient airfoil, this airflow produces a high lift over the entire surface of the wing, as described in my co-pending application Serial No. 369,638, filed July 22, 1953. It has been found in tests, that by inducing the radially inward airflow over the wing, by means of a propeller not attached to the wing in any way, that the wing lifts independently, proving that the downward thrust of the propeller is not essential to lift. By merely varying the speed of rotation of the impeller 36, the rate of ascent or descent of the aircraft can be closely controlled.

To obtain lateral motion or sideways flight at low speeds, the shroud ring 24 and impeller 36 may be tilted about the longitudinal axis together with the gimbal ring 18, by means of the actuating motor 48. This causes an offset of the airflow through the shroud ring 24 and also causes an uneven radial airflow over the wing 10 so that the wing has more lift on one side than on the other. The wing 10 thus tilts and the aircraft moves in the direction of the low lift side of the wing.

For hovering and forward or backward directional control at low speed, the impeller 36 may be tilted as necessary within the gimbal ring 18 by means of the actuating motors 50, thus causing uneven airflow over the wing 10 so that the required airspeed or ground speed in the desired direction as explained above is attained.

Figure 3:
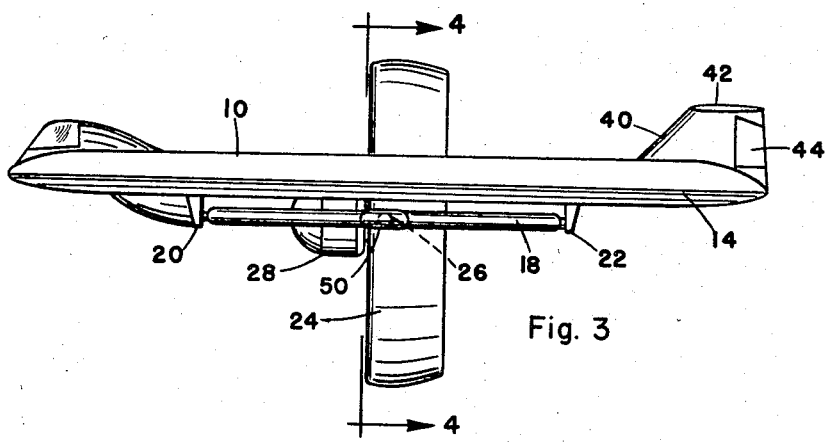
Figure 3 is a side elevation view of the aircraft showing the impeller tilted to the full forward flight position.
Figure 4:
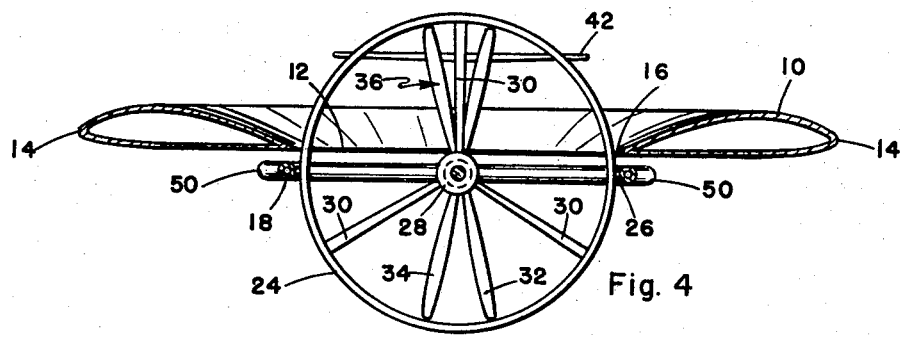
Figure 4 is a sectional view taken on the line 4—4 of Figure 3.

For full forward flight at high speed, the impeller 36 may be tilted 90 degrees so that the rotational axis of the impeller is parallel to the longitudinal axis of the aircraft, as in Figures 3 and 4. With all the thrust directed to the rear, the aircraft is driven forward and is maintained in flight by the rearwardly moving air over the wing. The transition from vertical to horizontal flight is best accomplished by first slightly tilting the impeller 36 to give the aircraft a slow speed forward motion. When sufficient forward speed has been obtained to maintain the aircraft in flight, the impeller speed is reduced while the impeller is tilted to the full forward thrust, after which the impeller speed may be increased for high speed flight. The reduction of rotational speed while the impeller is being tilted prevents undue directional change of the aircraft during the transition stage, although under certain circumstances it may be found that the impeller may be tilted quickly enough to avoid effects of offset thrust. It is realized that the efficiency of the wing 10 in forward flight is less than that of a conventional wing, but the large total area of the wing provides ample lift. Furthermore, due to the fact that the airfoil of the rear portion of the wing is now reversed to the airflow, the forward portion will tend to be raised due to its more effective lifting properties. This is compensated for by the weight of the motor 28 which is moved forward as the impeller is tilted to the forward flight position, although suitable aerodynamic means could also be used.

It should be understood that the structure, mounting and design of the impeller 36 and shroud ring 24 are illustrative only and may be arranged to suit a particular aircraft. Similarly, the aerodynamic design of the aircraft may be varied to a considerable extent without departing from the basic function described herein.

The operation of this invention will be clearly comprehended from a consideration of the foregoing description of the mechanical details thereof, taken in connection with the drawing and the above recited objects. It will be obvious that all said objects are amply achieved by this invention.

Further description would appear to be unnecessary.

It is understood that minor variation from the form of the invention disclosed herein may be made without departure from the spirit and scope of the invention, and that the specification and drawing are to be considered as merely illustrative rather than limiting.

I claim:

1. An aircraft comprising a circular wing having a central circular opening therein; an impeller operatively mounted in said opening; said impeller being tiltably mounted for movement through an angle of approximately 90 degrees about an axis substantially coinciding with the lateral axis of the aircraft and supplying forward thrust in one position of the impeller and vertical thrust in another position thereof; and a shroud ring constituting a duct for said impeller and mounted to tilt therewith.

2. An aircraft comprising a circular wing having a central circular opening therein; an impeller operatively mounted in said opening; said impeller being tiltably mounted for movement through an angle of approximately 90 degrees about an axis substantially coinciding with the lateral axis of the aircraft and supplying forward thrust in one position of the impeller and vertical thrust in another position thereof; and said impeller also being tiltable about an axis parallel to the longitudinal axis of the aircraft; and a shroud ring for said impeller and mounted to tilt therewith.

3. An aircraft comprising a circular wing having a central opening therein; a gimbal ring mounted on said wing below and concentric with said opening; said gimbal ring being tiltably mounted for movement about an axis parallel to the longitudinal axis of the aircraft; an impeller operatively mounted in said gimbal ring and tiltable through an angle of at least 90 degrees about an axis parallel to the lateral axis of the aircraft and supplying forward thrust in one position of the impeller and vertical thrust in another position thereof; and a shroud ring for said impeller and mounted to tilt therewith.

4. An aircraft comprising a circular wing having a central opening therein; a gimbal ring mounted on said wing below and concentric with said opening; said gimbal ring being tiltably mounted for movement about an axis parallel to the longitudinal axis of the aircraft; a shroud ring concentrically mounted in said gimbal ring; an impeller operatively mounted within said shroud ring; said impeller and shroud ring being tiltable through an angle of at least 90 degrees about an axis parallel to the lateral axis of the aircraft and supplying forward thrust in one position of the impeller and vertical thrust in another position thereof.

5. An aircraft comprising a circular wing having a central opening therein; a shroud ring mounted on said wing at said opening for tilting movement through an angle of approximately 90 degrees about an axis substantially coincident with the lateral axis of the aircraft; and an impeller operatively mounted in said shroud ring and coaxially of said shroud ring; and means for tilting said shroud ring and impeller together and supplying forward thrust in one position of the impeller and vertical thrust in another position thereof.

6. An aircraft comprising a circular wing having a central opening therein; a shroud ring mounted on said wing at said opening for tilting movement through an angle of approximately 90 degrees about an axis substantially coincident with the lateral axis of the aircraft; and an impeller operatively mounted in said shroud ring and coaxially of said shroud ring; and means for tilting said shroud ring and impeller together and supplying forward thrust in one position of the impeller and vertical thrust in another position thereof; said shroud ring being also tiltable about the longitudinal axis of the aircraft for lateral thrust directional control.

References Cited in the file of this patent

UNITED STATES PATENTS

| | | |
|---|---|---|
| 2,119,369 | Twining | May 31, 1938 |
| 2,639,582 | Pearlman | May 26, 1953 |
| 2,718,364 | Crabtree | Sept. 20, 1955 |
| 2,726,829 | Hillis | Dec. 13, 1955 |